US012488796B1

(12) United States Patent
Copeland et al.

(10) Patent No.: US 12,488,796 B1
(45) Date of Patent: Dec. 2, 2025

(54) LANGUAGE MODEL ARBITRATION FOR NATURAL LANGUAGE PROCESSING

(71) Applicant: Amazon Technologies, Inc., Seattle, WA (US)

(72) Inventors: Robert O'Neal Copeland, Ontario (CA); Alexander Thomas Loeb, Bothell, WA (US); Hyungseo Park, Seattle, WA (US); Archit Jain, Kenmore, WA (US); Chenlei Guo, Redmond, WA (US); Xing Fan, Redmond, WA (US); Kerry Hammil, Bainbridge Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 220 days.

(21) Appl. No.: 18/367,272

(22) Filed: Sep. 12, 2023

(51) Int. Cl.
*G10L 15/18* (2013.01)
*G10L 15/22* (2006.01)

(52) U.S. Cl.
CPC .............. *G10L 15/22* (2013.01); *G10L 15/18* (2013.01); *G10L 2015/223* (2013.01)

(58) Field of Classification Search
CPC ... G10L 15/18; G10L 2015/223; G10L 15/22; G10L 15/08; G10L 15/02; G10L 15/083; G10L 15/1815; G10L 2015/228; G06F 40/35; G06F 30/27; G06F 40/216; G06F 40/44

USPC ......................................................... 704/275
See application file for complete search history.

(56) References Cited

U.S. PATENT DOCUMENTS

| | | | | |
|---|---|---|---|---|
| 11,862,149 | B2 * | 1/2024 | Rajbhandari | G10L 15/22 |
| 12,205,580 | B1 * | 1/2025 | Pemberton | G06F 40/30 |
| 2017/0278514 | A1 * | 9/2017 | Mathias | G06F 16/35 |
| 2022/0358908 | A1 * | 11/2022 | Gandhe | G10L 15/065 |
| 2023/0359789 | A1 * | 11/2023 | Andre | G06F 30/27 |
| 2024/0071385 | A1 * | 2/2024 | Whalin | G10L 15/1822 |
| 2024/0119932 | A1 * | 4/2024 | Khorshid | G06Q 50/01 |
| 2025/0006196 | A1 * | 1/2025 | Wang | G06F 40/44 |

\* cited by examiner

*Primary Examiner* — Vijay B Chawan
(74) *Attorney, Agent, or Firm* — K&L Gates LLP

(57) ABSTRACT

Devices and techniques are generally described for arbitration between LLM-based and intent-based natural language processing flows. In various examples, an automatic speech recognition (ASR) component may generate first ASR output data representing the first natural language input. A first machine learning model may select an LLM-based natural language processing flow. The first machine learning model may be trained to select between at least the LLM-based and non-LLM-based natural language processing flows. The first ASR output data may be processed using the LLM-based processing flow. The LLM-based processing flow may generate first executable data.

20 Claims, 8 Drawing Sheets

| Utterance | Processing flow selected | Score | Result | Context data |
|---|---|---|---|---|
| A | LLM-based | 0.81 | LightID_127 set to 50% brightness | Device ID, account ID, time, device state(s), ... |
| B | Non-LLM-based | 0.04 | No action taken | Device ID, account ID, time, device state(s), ... |
| ... | ... | ... | ... | ... |
| N | Non-LLM-based | 0.98 | Music stopped on device_616 | Device ID, account ID, time, device state(s), ... |

FIG. 7

LANGUAGE MODEL ARBITRATION FOR NATURAL LANGUAGE PROCESSING

BACKGROUND

People can interact with computing devices using spoken commands. In some systems, a "wakeword" is used to activate functionality. Natural language processing is used to transform the spoken requests that follow into a computer directive for performing a task.

BRIEF DESCRIPTION OF DRAWINGS

FIG. 7 is an example of training data that may be used for language model arbitration for natural language processing, in accordance with various aspects of the present disclosure.

DETAILED DESCRIPTION

Figure 1:
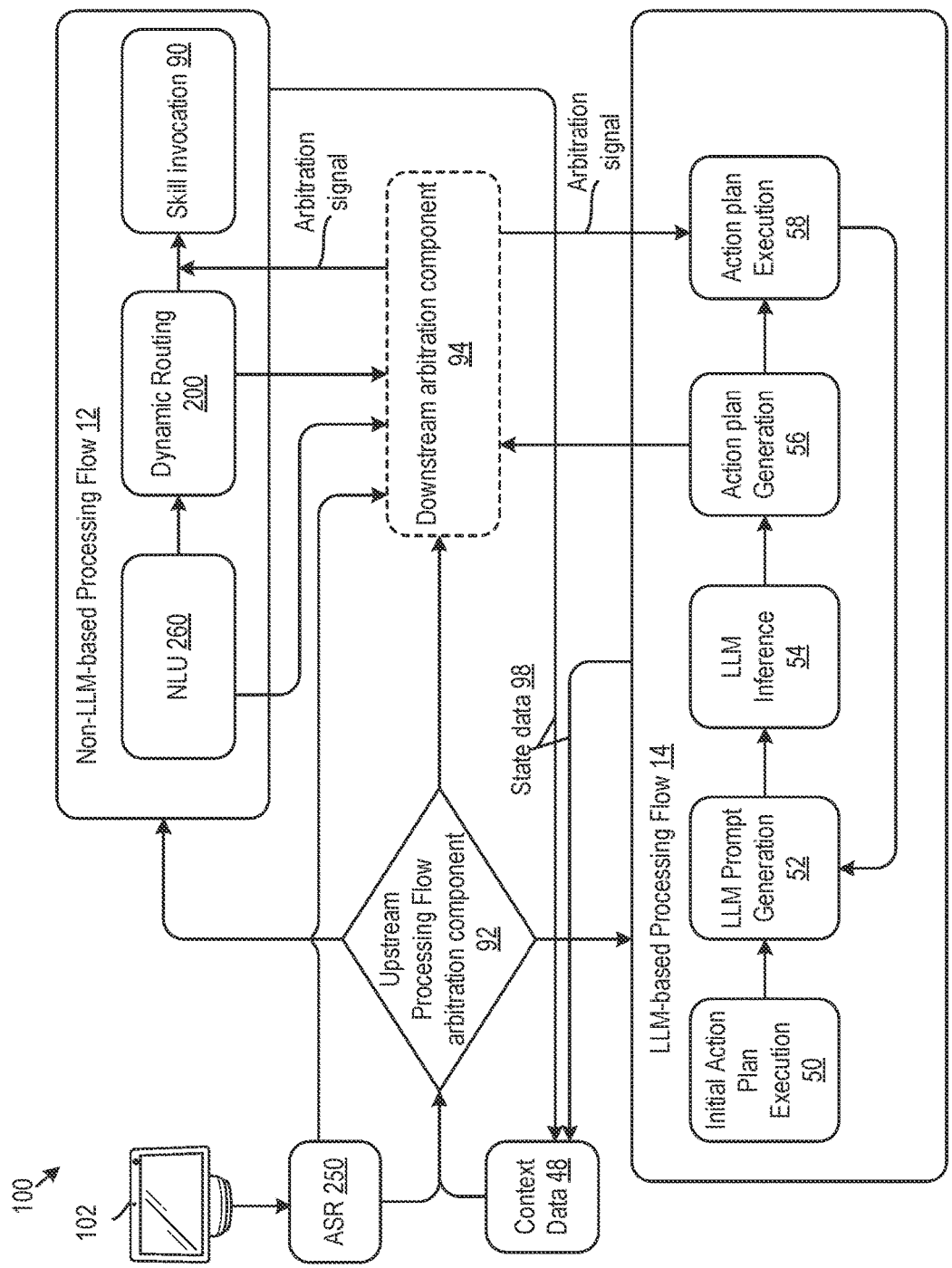
FIG. 1 is a block diagram illustrating an example system for language model arbitration for natural language processing, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, communicate with other people/devices, and/or otherwise interact with the devices and/or other devices. As such devices become more and more prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

Software (e.g., natural language processing applications (e.g., skills) configured to work with a natural understanding user interface, computer-implemented functions, etc.) may be selected to process all or part of a given natural language request and/or to perform other functionality that may be used to perform an action in response to the natural language request. For example, a music skill may be used in response to a request to playback particular songs, albums, artists, musical genres, etc. In another example, a smart home processing domain may expose an application programming interface (API) that provides access to various functions that may be used during natural language processing. For example, a natural language processing system, upon receipt of a request to turn on a smart light, may generate a function call (e.g., using the smart home API) that controls the smart light to turn off.

Each skill and/or API may be associated with its own functionality. Some skills/APIs may playback content such as the aforementioned music skill and/or a video skill/API. Other skills and/or APIs may provide answers to user questions, may be used to control devices (e.g., self-driving robots, thermostats, security systems, cameras, etc.), may be used to make purchases (e.g., ordering food, taxis, goods/services from online store, etc.), and/or perform a myriad of other actions. A large number of skills/API functions may be implemented to respond to and/or otherwise process user inputs. For example, many natural language processing systems may offer APIs whereby other pieces of software, such as skills, can be routed data and commands from the natural language processing system.

Different natural language processing flows may be employed in order to process a natural language request (e.g., a spoken or written request). In various examples, natural language processing systems may employ automatic speech recognition (ASR) components to transform spoken requests into ASR output data (e.g., text, token data, etc.) that represents the spoken request. In a first example natural language processing flow, the ASR output data may be processed using a natural language understanding (NLU) component. The NLU component may comprise one or more statistical models that may determine intent data representing a semantic interpretation of the intent of the request. Additionally, named entity recognition (NER) may be used to determine any named entities included in the request. In various examples, a routing system may be used to determine a natural language processing application for processing the request (e.g., based on the determined intent, the named entities, the ASR output data, etc.). For example, the routing system may select a skill for processing the request. The skill may support various functionality and may process the request according to the intent, the slot data (e.g., the named entities in the request), and the functionality of the skill itself to take some action in response to the request (e.g., turning on a light, setting an alarm, controlling music playback, answering a question, etc.). In various examples described herein, such a natural language processing flow may be described as an intent-based processing flow (e.g., a non-large language model-based processing flow (a "non-LLM-based processing flow")).

Other example natural language processing flows may employ one or more LLMs in order to process natural language requests. An LLM is an artificial intelligence (AI) model that may be capable of processing and generating human-like text based on the latent information it has learned from vast amounts of training data. The term "large" refers to the size of these models in terms of the number of parameters or weights, which are the values that the model learns during training to make predictions and generate text. LLMs may have millions, billions (or even more) parameters, which enable such models to capture complex patterns and nuances in language that, in turn, allow the models to understand and generate more natural-sounding text (relative to previous approaches). Examples of LLMs include the generative pre-trained transformer models (e.g., GPT-3, GPT-4), BERT (bidirectional encoder representations from Transformers), etc.

LLMs are typically trained on massive datasets that include a wide variety of text from various sources, enabling the LLMs to understand grammar, context, and the relationships between words and sentences. In various examples described herein, a natural language processing flow may employ an LLM to process a natural language request. Instead of using NLU to determine an intent and routing the request (including the intent data) to a particular skill for processing as in the non-LLM-based process flow described above, an LLM-based natural language processing flow may generate a prompt from the ASR output data that may be fed into the LLM. The LLM may be trained to output a text-based action plan which may be a formatted into a series of computer-executable actions (including API calls to various subsystems) that may be taken in order to process the natural language request. In various examples, an LLM-based processing flow may be a recursive process wherein the initial action plan may be executed (e.g., by making various API calls to API providers to receive results/responses), and the responses may be used to generate updated LLM prompts which may then be input into the LLM for generation of an updated action plan. Unlike the non-LLM-based processing flow described above, an LLM-based processing flow may not use NLU to determine intent data, and may not route intent and/or slot data (e.g., named entities) to a skill or other natural language processing system. Instead, the action plan generated by the LLM-based processing flow may use a series of function calls to take the necessary actions used to respond to the natural language request. Both LLM-based and non-LLM based natural language processing flows are described in further detail below.

There may be various cases where multiple natural language processing flows may be employed simultaneously and/or may be available for processing different input natural language requests. For example, one natural language processing flow may be better able to handle certain types of requests relative to another natural language processing flow. Additionally, different natural language processing flows may be associated with different latencies and/or computing costs. For example, in general, an LLM-based processing flow may be slower and more computationally expensive relative to a non-LLM-based processing flow. However, an LLM-based processing flow may be better able to process more nuanced natural language requests relative to a non-LLM-based processing flow. For example, consider the request, "Make sure outdoor lights are on anytime the garage is opened." A non-LLM-based processing flow may have trouble determining the intent of this request and/or may not understand that the user is seeking to establish a routine. By contrast, an LLM-based processing flow may understand that the user wants to trigger the outdoor lights to turn on whenever the garage door is opened and may generate an action plan that results in the outdoor lights being turned on as a consequence of the garage door opening. In some examples, there may be multiple LLM-based processing flows, where each flow includes an LLM that has been fine-tuned using domain-specific knowledge. For example, a first LLM-based processing flow may be tuned for answering questions (e.g., using a knowledge base), while a second LLM-based processing flow may be fine-tuned for smart home control. Accordingly, a given request may be routed to the appropriate domain-specific LLM processing flow (or to a subset of potentially relevant processing flows).

Described herein are various systems and techniques that may be used to arbitrate between different natural language processing flows. In some examples, an "upstream" processing flow arbitration component may select one or more natural language processing flows for processing a given natural language request. For example, the upstream processing flow arbitration component may select an LLM-based processing flow over a non-LLM-based processing flow. In another example, the upstream processing flow arbitration component may select a sub-set of available natural language processing flows for processing a given natural language request. The upstream processing flow arbitration component may employ machine learning-based approaches and/or may use rule-based utterance matching to determine the appropriate processing flow(s) to which to route a given request, depending on the desired implementation.

In still other examples, a "downstream" arbitration component may select between the results of different natural language processing flows that have been used to process a given natural language request. In various cases, the downstream arbitration component may select between currently-executing natural language processing flows. For example, the downstream arbitration component may determine that one or more natural language processing flows that are currently executing should be terminated (e.g., due to a determination that it is unlikely to generate a high quality result and/or due to the fact that a high quality result has been returned, or is likely to be returned, by a different natural language processing flow).

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data (e.g., intent data) or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, NLG, and TTS may be used together as part of a natural language interface system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the natural language processing system. For example, initially the request data may be audio data and/or input text data representing a user question. The audio data may be transformed into text data and/or other ASR output data by an ASR component of the speech processing system. In non-LLM-based processing flows, the text data and/or other ASR output data may be transformed into intent data by an NLU component of the speech processing system. The intent data may be used by a speech processing application (e.g., a skill) to perform an action (e.g., to generate action data (e.g., computer-executable commands) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software or the Cortana system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, LLM inference, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. LLMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., action plan generation for an LLM-based natural language processing flow, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token is the dot product between $q_i$ and $k_j$. The attention weights are divided by the square root of the dimension of the key vectors, dk, which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 is a block diagram illustrating an example system 100 for language model arbitration for natural language processing, in accordance with various aspects of the present disclosure. In various examples, a natural language processing-enabled device 102 may be effective to receive spoken requests (e.g., via one or more microphones) and/or other natural language requests (e.g., written text) and may process the received input using ASR component 250. ASR component 250 may be executed locally by the natural language processing-enabled device 102, remotely by a remote natural language processing system, and/or by some combination of the two. The ASR component 250 may generate ASR output data (e.g., text) that may represent a transcription of a spoken user request. In examples where the natural language input is received as text, ASR component 250 may be by-passed and/or may be used to transform the input text into a format that is suitable for further processing (e.g., tokenization). Non-LLM-based processing flow 12 and/or LLM-based processing flow 14 may be executed by one or more remote computing devices with respect to the natural language processing-enabled device 102. However, in some examples, one or more components of the non-LLM-based processing flow 12 and/or LLM-based processing flow 14 may be executed locally by the natural language processing-enabled device 102. In addition, the ASR component 250 may be implemented locally by the natural language processing-enabled device 102 or remotely by another device.

Upstream processing flow arbitration component 92 may be effective to determine which natural language processing flow (or set of natural language processing flows) is selected to process a given input request. The inputs to the upstream processing flow arbitration component 92 may include the ASR output data (e.g., text of the request) and/or context data 48. Context data 48 may include such information as device ID (an identifier of the device receiving the spoken or written request), ASR hypotheses, confidence scores for ASR hypotheses, device state information (e.g., whether the device is in playback mode, sleep mode, battery life, data identifying content being played by the device, etc.), geographic information, user identification information (e.g., an identifier of a user making a spoken request (if permission to use such information is granted by the user), account identifier information, a list of other devices associated with the account, the state of these other devices, local time information, on-going dialog session data (e.g., state data 98) describing any past turns of a current dialog session between a user and one or more of the various natural language processing flows described herein, etc.

In some examples, the upstream processing flow arbitration component 92 may comprise a classifier model that is trained (e.g., using supervised machine learning techniques) to select one or more natural language processing flows for processing a given natural language input. The classifier model may select the one or more natural language processing flows based on historical performance of the various different natural language processing flows for the same or similar utterances, as described in further detail below. In various other examples, the upstream processing flow arbitration component 92 may determine that certain utterances and/or keywords may be designated to a particular natural language-based processing flow. For example, when an utterance matches a keyword and/or is otherwise determined to pertain to a specific natural language processing flow, a flag (e.g., flag data, such as one or more indicator bits) may be set corresponding to the pre-designated natural language processing flow. The flag may be associated with a particular time-to-live (TTL) value. If another utterance is received at the same device prior to expiration of the TTL value, the TTL value of the flag may be extended and the newly-received utterance may be routed to the pre-designated processing flow.

In some further examples, LLM-based processing flow 14, non-LLM-based processing flow 12, and/or other natural language processing flows may send state data 98 indicating a current state (e.g., data indicating a state of the dialog, such as whether the natural language processing flow is currently processing an utterance that is part of a dialog session and/or is in a particular turn of dialog) to an orchestration component. The orchestration component (not shown in FIG. 1) may track dialog session data and/or store dialog session data as state data 98 (which may be part of context data 48). For example, state data 98 may indicate that there is an on-going dialog session with a user and/or a current natural language processing state of the various natural language processing flows. In this context, a dialog session may include one or more user inputs (user-input text or speech) and one or more system responses (e.g., a back-and-forth dialog between the user and the natural language processing system without intervening wake-words) without a user needing to repeat a wakeword. In various examples, state data 98 indicating that a current dialog session is being processed by a particular natural language processing flow (or multiple natural language processing flows) may be used as a signal to upstream processing flow arbitration component 92 and/or downstream arbitration component 94. For example, the state data 98 may be used to compute one or more features that may be ingested as an input to one or more machine learning models (e.g., neural classifier models) employed by the upstream processing flow arbitration component 92 and/or the downstream arbitration component 94. A signal indicating that the current dialog session is being processed by a particular natural language processing flow or set of flows may tend to result in subsequent utterances in the dialog session being handled by the same natural language processing flow or set of flows. However, as with other probabilistic machine learning systems, the signal from state data 98 may not be dispositive and may be considered with other context data 48 according to the training of the machine learning models.

In another example implementation, utterances may continue to be routed to the pre-designated natural language processing flow during a dialog session until the flag expires or until the current dialog session ends (e.g., times out). In an example, utterances that are determined to relate to a smart home domain may be routed to the LLM-based processing flow 14, while utterances that are related to a music domain may be routed to the non-LLM-based processing flow 12.

It should be noted that while two natural language processing flows (non-LLM-based processing flow 12 and LLM-based processing flow 14) are depicted in FIG. 1, additional natural language processing flows may be used and arbitrated between by the upstream processing flow arbitration component 92. The upstream processing flow arbitration component 92 may select a single natural language processing flow or a set of natural language processing flows for processing a given request, depending on the desired implementation. For example, there may be domain-specific and/or use-case specific natural language processing flows (e.g., a smart home LLM-based processing flow, a question-and-answer non-LLM-based processing flow, etc.) and/or natural language processing flows with different capabilities/specializations. Accordingly, the upstream processing flow arbitration component 92 may match natural language inputs to the appropriate natural language processing flow best able to process the inputs based on the subject of the natural language input corresponding to the domain/specialty/capability of the natural language processing flow. For example, a request to "dim the living room light" may be routed by the upstream processing flow component 92 to a natural language processing flow associated with a smart home domain based on the user utterance referring to a "living room light" and based on the capabilities of the smart home domain natural language processing flow. In various examples, the upstream processing flow component 92 may include logic to accept permissions and/or configuration parameters indicating enabled skills and/or natural language processing flows for a given user account or set of accounts. For example, a particular user may disable the natural language processing flow related to smart home natural language requests. Accordingly, the upstream processing flow component 92 may not select the non-enabled natural language processing flow for processing a given utterance, irrespective of whether the non-enabled natural language processing flow may otherwise be the best processing flow for processing the utterance. In various examples, a user may subscribe to and/or enable various skills and/or natural language processing flows via a companion application or other user interface associated with system 100.

As previously described, the non-LLM-based processing flow 12 may take the ASR output data (e.g., the text transcription of the utterance) as input to NLU component 260. The NLU component 260 may output intent data comprising a semantic representation of an intent of the utterance. The intent data and the ASR output data may be used as part of a dynamic routing architecture 200 that may be used to select at least one skill to which to route the utterance for processing. The dynamic routing architecture 200 of the non-LLM-based processing flow 12 is described in further detail below in FIG. 2. After selecting the skill for processing the utterance, the skill may be invoked (at skill invocation 90). The skill may take an action in response to the user utterance (e.g., playing a song, stopping an alarm, answering a question, etc.). The non-LLM-based processing flow 12 may include other components apart from the simplified architecture shown in FIG. 1. Additional components and functionality of the non-LLM-based processing flow 12 are shown and described in reference to FIG. 2.

The LLM-based processing flow 14 may comprise an initial action plan execution 50. The initial action plan execution 50 may take metadata associated with the request (e.g., context data 48 and/or other metadata describing the request received by the natural language processing enabled device 102) and the ASR output data as input and may determine one or more function calls (e.g., API calls that may return information that may be used to retrieve data and/or functions that may be used to generate a prompt for the LLM).

For example, if the request is "please turn on the kitchen lights every morning at 7 am," then the initial action plan execution 50 may determine prompt generation action plan data representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. LLM prompt generation 52 may take the preliminary action plan data generated during initial action plan execution 50 and the ASR output data and may generate a prompt for input into the LLM.

The prompt may be generated by applying one or more policies to the ASR output data (e.g., the text of the request). The policy data may filter out certain non-permitted information (e.g., personally-identifiable information) or sensitive information and/or may apply rules to ensure the ASR output and/or the generated prompts complies with the applicable policies. The policy data may be configurable and may vary depending on the desired implementation. The prompt may be structured in such a way that the user request is formatted for input into the LLM. The prompt may include some of the information retrieved during the initial action plan execution 50. For example, the prompt may include exemplars corresponding to the necessary actions used to carry out the request, one or more function calls pertaining to the request, results of function calls returned from the initial action plan execution 50, etc. The LLM may take the prompt generated by the LLM prompt generation 52 as input (LLM inference 54) and may generate an action plan 56. The action plan 56 may include a formatted series of actions that should be taken in order to respond to the user request. For example, if the user request is to "Please turn the light on," the action plan may be to retrieve a smart home specification using a smart home API, call a function to get device states of lighting devices associated with the user's account, and determine a function associated with the smart home specification that turns lights on. Accordingly, the action plan data may be a specially formatted series of actions (e.g., API calls) to back end systems used to retrieve the necessary information and perform the necessary actions to accomplish the user request.

The action plan execution 58 may involve performing the steps in the action plan. In the foregoing action plan example, the smart home specification may initially be retrieved using the smart home API. The action plan may instruct that the smart home specification (e.g., a schema) should be parsed to determine the various different function calls and/or exemplars related to the request (e.g., to turn on the light). The action plan execution 58 may determine the smart lights associated with the user account (using a function call of the smart home specification). The action plan execution 58 may determine a function call used to retrieve device state information for the device IDs associated with the user account by parsing the smart home specification. The action plan execution 58 may determine that there are two light devices associated with the user account with the state: OFF. The action plan execution may determine the function call used to turn a specific light on. This function call may take a device ID as an argument to select the specific light to turn on. However, in the current case, there are two smart lights with the state: OFF. Accordingly, in an example, this information may be passed back to the LLM prompt generation 52 which may again generate a prompt to disambiguate between the two smart lights. The LLM may perform inference using the prompt and may generate an updated action plan (action plan generation 56). The new action plan may, for example, invoke a text to speech (TTS) component to prompt the user to identify the light that they would like to turn on. Once the user identifies the desired light to be turned on, the function call to turn that light on may be made with the appropriate light ID as the argument. Accordingly, the LLM-based processing flow 14 may be recursive in nature in order to iteratively generate an action plan that can accomplish the requested action. The LLM-based processing flow 14 may include other components apart from the simplified architecture shown in FIG. 1. Additional components and functionality of the LLM-based processing flow 14 are shown and described in reference to FIG. 8.

Downstream arbitration component 94 may arbitrate between multiple natural language processing flows if multiple processing flows have been selected for processing a given request by the upstream processing flow arbitration component. In a simple example, the upstream processing flow arbitration component 92 may have selected both the non-LLM-based processing flow 12 and the LLM-based processing flow 14 for processing an utterance. In this example, the utterance may be, "Please turn down the volume, I can't hear." The downstream arbitration component 94 may use a rule-based approach and/or a machine learning based approach to select between the results returned by the non-LLM-based processing flow 12 and the LLM-based processing flow 14. In some examples, the downstream arbitration component 94 may make the determination based on the proposed action (e.g., the final result) determined by each natural language processing flow. However, such an approach may incur an undesirable amount of latency from the user perspective. Accordingly, in some examples, the downstream arbitration component 94 may ingest signals generated during processing by one or more of the different natural language processing flows and may generate scores for the processing flows in real time (e.g., scores indicating a likelihood that the correct action and/or a user-desired action will be returned). The arbitration component 94 may make a decision to terminate one or more processing flows on the basis of such scores in favor of one or more likely-to-be-successful processing flows. Signals input to the downstream arbitration component 94 may include the ASR output, context data 48, intent data (generated by NLU component 260), a routing plan generated by dynamic routing architecture 200 (including data identifying one or more skills selected for processing the input), the action plan generated by the LLM-based processing flow 14 (during each iteration of the LLM-based processing flow 14), etc.

In the current example ("Please turn down the volume, I can't hear") the non-LLM-based processing flow 12 may return a result (e.g., to decrease playback volume by 20%) more quickly relative to the LLM-based processing flow 14. The downstream arbitration component 94 may determine that the returned result is likely to be the correct result (based on the same or similar historical requests for which that action was taken). Accordingly, the downstream arbitration component 94 may send an arbitration signal to the LLM-based processing flow 14 to terminate processing and may instruct the non-LLM-based processing flow 12 to take the returned action (to decrease playback volume by 20%). It should be appreciated that in other cases, the processing of any of the natural language processing flows may not yet be completed when the downstream arbitration component 94 makes an arbitration decision. Additionally, in some examples, the upstream processing flow arbitration component 92 may select only a single natural language processing flow for a given utterance. In such cases, the downstream arbitration component 94 may not be employed.

In some examples, the upstream processing flow arbitration component 92 may select LLM-based processing flow 14 for processing a request that the LLM-based processing flow 14 is either unable to handle or has been instructed not to handle. For example, the LLM of the LLM-based processing flow 14 may be trained to recognize actions that it cannot process/perform. For example, LLM-based processing flow 14 may not handle music requests implicating a particular third party music service (or music requests generally). In the example, a user may make the request "Play the most popular song by Band X." The upstream processing flow arbitration component 92 may select the LLM-based processing flow 14 to process the request, as described above. The LLM-based processing flow 14 may generate an action plan to retrieve various information related to servicing the request even though the LLM-based processing flow 14 is ultimately unable to perform the requested action (e.g., play a song using a third party music service). For example, the LLM-based processing flow 14 may call an API to determine that the most popular song by Band X is the song "Jump out and dance." The LLM-based processing flow 14 may reformulate the input query from "Play the most popular song by Band X" to "Play the song 'Jump out and dance' by Band X." The LLM-based processing flow 14 may send a signal to the upstream processing flow arbitration component 92 (and/or to an orchestrator of the non-LLM-based processing flow 12) indicating that the request "Play the song 'Jump out and dance' by Band X" is out of domain for the LLM-based processing flow 14. The non-LLM-based processing flow 12 may process the request "Play the song 'Jump out and dance' by Band X". In this example, it may be that the non-LLM-based processing flow would not have understood the initial user request, "Play the most popular song by Band X." In the example, the LLM-based processing flow 14 was able to determine the necessary context for the request, reformulate the request, and pass a reformulated request to the non-LLM-based processing flow 12 that could be successfully executed.

Figure 2:
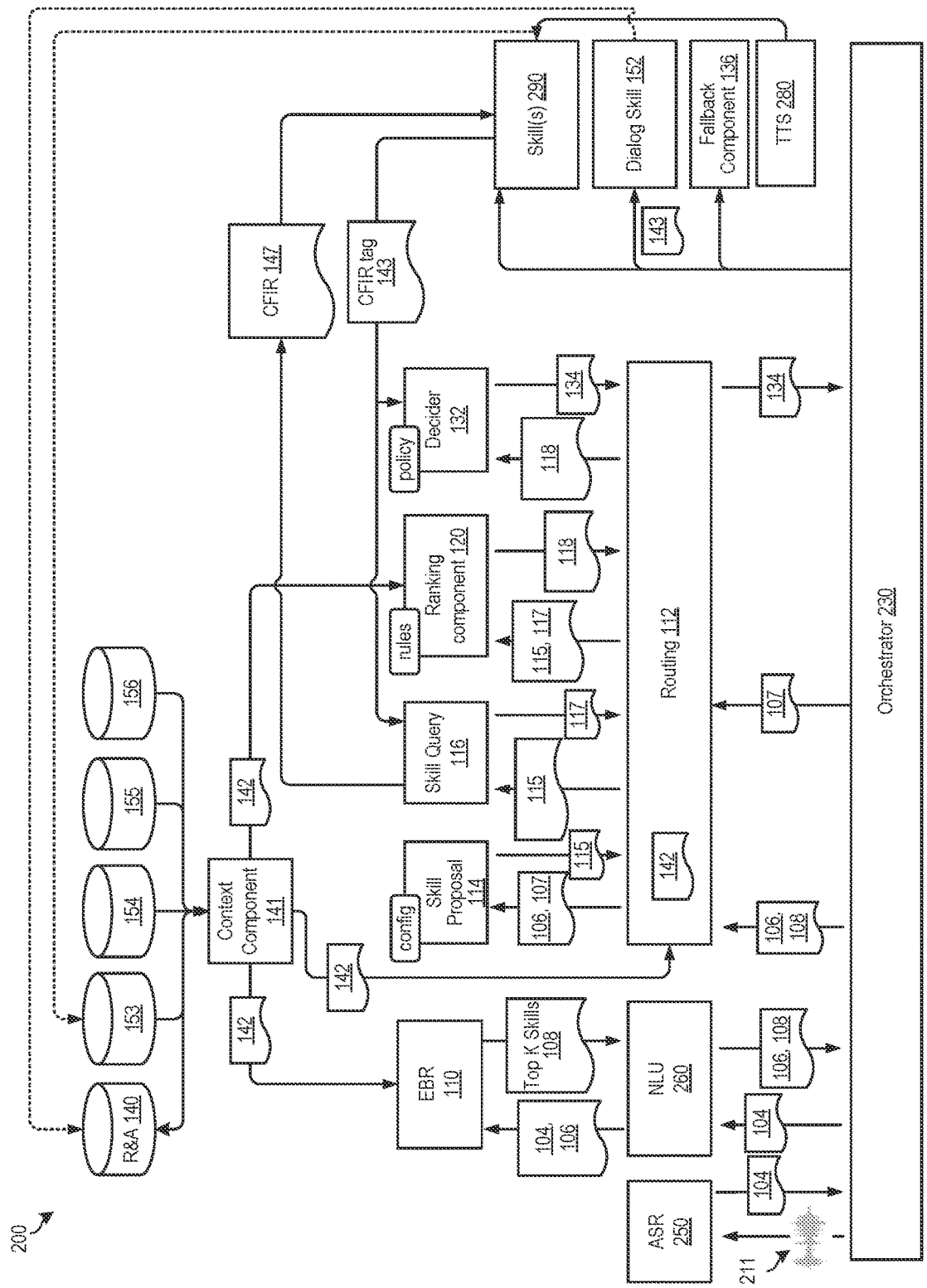
FIG. 2 is a block diagram illustrating an example natural language processing routing architecture for a non-large language model-based natural language processing flow, according to various embodiments of the present disclosure.

FIG. 2 is a block diagram illustrating an example natural language processing routing architecture 200 for a non-LLM-based natural language processing flow (such as non-LLM-based processing flow 12), according to various embodiments of the present disclosure. It should be noted that the natural language processing routing architecture 200 is merely one example implementation of a non-LLM-based natural language processing flow, and that any desired non-LLM-based natural language processing flow (which may differ in various respects relative to what is shown in FIG. 2) may be used for language model arbitration. In various examples below, skills may be referred to, however the techniques described herein with respect to skills are applicable to any natural language processing applications. The various components illustrated FIG. 2 may be located on the same or different physical devices. Communication between various components illustrated in FIG. 2 may occur directly or across a network. A speech processing-enabled device may capture audio using an audio capture component, such as one or more microphone(s). The speech processing enabled device may send audio data 211 (e.g., corresponding to request data) to an orchestrator 230. The speech processing enabled device may also send metadata (e.g., including device identifiers, device type data, contextual data, IP address data, room location data, etc.) to the orchestrator 230.

Upon receipt by the natural language routing architecture 200, the audio data 211 may be sent to an orchestrator 230. The orchestrator 230 may include memory and logic that enables the orchestrator 230 to initiate a dialog session and to transmit various pieces and forms of data to various components of the system, as described in further detail below.

The orchestrator 230 may send the audio data 211 to an ASR component 250 (e.g., a speech recognition component). The ASR component 250 may transcribe the audio data 211 into one or more hypotheses representing speech contained in the audio data 211. The ASR component 250 interprets the speech in the audio data based on a similarity between the characteristics of the audio data corresponding to the speech and pre-established language models. For example, the ASR component 250 may compare the audio data 211 with models for sounds (e.g., subword units such as phonemes) and sequences of sounds to identify words that match the sequence of sounds in the speech represented in the audio data 211. The ASR component 250 may send text data and/or other ASR output data 104 generated thereby to orchestrator 230 that may, in turn, send the text data (and/or other ASR output data 104) to NLU component 260. As previously described, the text data and/or other ASR output data 104 may include one or more ASR hypotheses. The text data and/or other ASR output data 104 may include a top scoring hypothesis of the speech represented in the audio data 211 or may include an N-best list including a group of hypotheses of the speech represented in the audio data 211, and potentially respective scores ASR processing confidence scores. As previously described, in some other examples, the ASR component 250 (and/or other components of the natural language routing architecture 200) may generate other metadata associated with the request such as an overall utterance confidence score, per-word (e.g., per token) confidence scores for the utterance, utterance duration, stream duration (e.g., duration of the stream of audio data from speech processing enabled device to natural language routing architecture 200), a number of tokens output by ASR, etc.

The NLU component 260 attempts to make a semantic interpretation of the phrases or statements represented in the text data (and/or other ASR output data) input therein. That is, the NLU component 260 determines one or more meanings associated with the phrases or statements represented in the text data and/or other ASR output data 104 based on individual words represented in the text data (and/or other ASR output data 104). The NLU component 260 interprets a text string to derive an intent of the user (e.g., an action that the user desires be performed) as well as pertinent pieces of information in the text data (and/or other ASR output data) that allow a device (e.g., the speech processing enabled device, the natural language routing architecture 200, a computing device(s) implementing a speech processing application, etc.) to complete the intent. For example, if the text data and/or other ASR output data 104 corresponds to "Set temperature to 74 degrees," the NLU component 260 may determine the user intended to invoke a climate intent with a target temperature value slot of 74 degrees Fahrenheit. As previously described, in addition to the NLU intent and slot data, the NLU component 260 may generate other metadata associated with the request (e.g., with the audio data 211). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speech processing application, intent, and/or slot), entity recognition confidence scores, entity recognition match types (e.g., exact match, prefix match, suffix match, etc.), etc. Herein, the data output by the NLU component 260 (depicted in FIG. 2 as "NLU 260") is referred to as NLU output data 106.

NLU component 260 may send the text data (and/or other ASR output data 104) and/or some of NLU output data 106 (such as intents, recognized entity names, slot values, etc.) to an embedding-based retrieval component 110 (sometimes referred to as a "shortlister"). The embedding-based retrieval component 110 may determine a similarity between an embedding (e.g., a high-dimensional vector) representing the natural language input and embedding data stored in various indices that are associated with different skills.

The embedding-based retrieval component 110 may request contextual data 142 from the context component 141 and the context component 141 may send contextual data 142 to embedding-based retrieval component 110. In various examples described herein, the contextual data 142 may include a list of preferred skills associated with the request, user account data, device identifier data, and/or data indicating that a particular agent that has been invoked (e.g., with a speech processing agent that is associated with the request). In various examples, the embedding-based retrieval component 110 may ingest this contextual data 142 as input (e.g., input features) and may generate the list of candidate skills for processing the current input request data based at least in part on the contextual data 142. For example, if the device from which the input utterance was received is associated with a particular set of skills, a pre-filtering operation may be performed so that the embedding-based retrieval component 110 considers only those skills when searching the skill indices.

In various examples, the embedding-based retrieval component 110 may generate similarity scores for each of the candidate skills indicating a similarity between the natural language input and an utterance that is stored in an index in association with the particular skill. The similarity scores may be sent to the ranking component 120 and used as input to machine learned models of the ranking component 120 in order to rank candidate data (e.g., <interpretation, skill, skill session, agent>hypotheses) for processing the input request data.

Embedding-based retrieval component 110 may send the top K skills 108 to NLU component 260. NLU component 260 may thereafter perform skill-specific NLU processing for the skills in the top K skills 108 to determine skill-specific intents, slots, and/or named entities. NLU output data 106 may include such skill-specific data (e.g., skill-specific N-best hypotheses). In addition, NLU component 260 may determine interpretations of the input request data (e.g., the ASR output data 104 that are for other skills apart from the top K skills 108 output by the embedding-based retrieval component 110. In some examples, generating pre-computed features based on user feedback data by ranking and arbitration component 140 may generate increasingly contextually rich feature data that may be used to train various machine learning models used to route speech processing request data (e.g., upstream processing flow arbitration component 92, downstream arbitration component 94, ranking component 120, embedding-based retrieval component 110, etc.).

Ranking and arbitration component 140 may communicate with various systems in order to obtain source data used to precompute features. In an example embodiment, ranking and arbitration component 140 may receive source data used to precompute features that is generated by other speech processing components (e.g., NLU component 260, ASR component 250, etc.). For example, NLU intent data may be used to pre-compute features for some downstream speech processing component (e.g., ranking component 120). Ranking component 120 may be "downstream" in the sense that processing by NLU component 260 occurs prior to processing by ranking component 120 during a given dialog session. In another example, ranking and arbitration component 140 may communicate with feedback storage 153 to receive user feedback data (e.g., explicit and/or implicit user feedback related to user satisfaction with processing of one or more request data) used as source data to precompute features. In various examples, the user feedback data may be user-specific and/or device specific and may indicate whether a user was satisfied or not satisfied with a particular interaction with natural language routing architecture 200. Additionally, ranking and arbitration component 140 may communicate with endpoint context system 154, which may provide context data at the conclusion of a user interaction with the natural language routing architecture 200. In another example, ranking and arbitration component 140 may communicate with speech processing application data 156 to determine information from the speech processing application regarding past interactions with the speech processing application and/or data acquired by the speech processing application. Additionally, ranking and arbitration component 140 may communicate with other data sources 155, as new services are added and/or as new data types that may be useful for routing prediction are made available. In addition to ranking and arbitration component 140 using contextual data 142 to precompute features used by various machine learning models of the routing architecture of the natural language routing architecture 200, a context component 141 may receive the contextual data 142. The context component 141 may provide the context data directly to both ranking and arbitration component 140 as well as to various components of the routing architecture of natural language routing architecture 200. For example, the context component 141 may send contextual data 142 to embedding-based retrieval component 110 and/or ranking component 120 in order to determine a shortlist of skills 290 for particular request data and/or in order to rank the shortlisted speech processing applications.

NLU output data 106 (e.g., intent data comprising semantic interpretations of the input request data) and top K skills 108 may be sent by NLU component 260 to orchestrator 230. Orchestrator 230 may send the top K skills 108 and the NLU output data 106 to routing component 112. Routing component 112 may query context component 141 using one or more of the device ID, entity ID, and/or deviceType ID received as part of the input request data. In response, the context component 141 may send contextual data 142 to routing component 112. In addition, embedding-based retrieval component 110 may receive the slot data (included in NLU output data 106) as well as the device state data, as described above in reference to FIG. 1 and may select one or more skill sessions 107 on which to act for the input request. The selected skill session 107 may be sent from embedding-based retrieval component 110 to routing component 112.

Routing component 112 may send the top K skills 108, the selected skill session 107, and NLU output data 106 to skill proposal component 114. Skills 290 may subscribe to particular intents using skill proposal component 114. Accordingly, skill proposal component 114 may receive the NLU output data 106 and may determine whether any of the included intents correspond to one or more of skills 290 that have registered for the particular intent. If so, skill proposal component 114 may generate candidate data 115 comprising <interpretation, skill, skill session, agent>candidate quads. The candidate data 115 may be sent to routing component 112.

The hypothesis data comprising the candidate data 115 may be sent by routing component 112 to skill query service 116. Skill query service 116 comprises an API through which skills 290 may "opt out" of particular requests. For example, a skill 290 may comprise a video playback skill. Accordingly, the skill 290 may register with skill query service 116 to indicate that only requests made on a device with a display screen should be routed to the particular skill 290. In addition, skills 290 may communicate availability information, pricing information, and/or other structured descriptions of how and under what circumstances (e.g., determined using context data) the skill 290 can fulfill a request included in the current request data.

Skill query service 116 provides a capability for speech processing applications (e.g., skills) to provide signals to ranking component 120 that indicate how well the particular speech processing application may handle the current request data. For example, skill query service 116 may send a "Can fulfill intent request" (CFIR) 147 to candidate skills (e.g., top K skills 108 output by embedding-based retrieval component 110). CFIR 147 may include intent data and/or slot data (e.g., the interpretation of the input request) from the NLU output data 106. Each of the candidate skills may respond to the CFIR 147 with CFIR response data indicating whether the skills are able to process the current request data. Additionally, one or more of the candidate skills may respond to the CFIR 147 with CFIR tag 143, which may be metadata indicating an action and/or type of action that the particular candidate skill will perform if the request data is routed to the particular candidate skill for processing.

As previously described, the various candidate skills may evaluate an ability to fulfill a current request based on a determination as to whether the skill is effective to process the intent data and/or recognize the slot data that is provided with the CFIR 147. Additionally, the skill may include a CFIR tag 143 with the response data that indicates a particular action that the skill would take if the skill is ultimately selected for processing the current request. For example, the CFIR tag 143 may be metadata indicating that the skill is able to process the intent successfully. In another example, the CFIR tag 143 may indicate that the skill intends to engage the user in a dialog in response to being selected to process the current request. In another example, the CFIR tag 143 may indicate that the skill intends to initiate streaming of video and/or audio (e.g., initiate video playback and/or audio playback) in response to being selected to process the current request. In another example, the CFIR tag 143 may indicate that the skill intends to render a spoken response (e.g., audio data output by a TTS component) to the user in response to being selected to process the current request.

In various examples, skill query service 116 may generate a signal 117 representing the CFIR tag 143 and/or the candidate skills' responses to eligible skill capability data (which may be provided as part of contextual data 142). If the skill action represented by the CFIR tag 143 does not correspond to the skill capability, the hypothesis including the relevant candidate data 115 may be filtered out (e.g., excluded from further routing decisions). Conversely, if the CFIR tag 143 represented by signal 117 indicates an action that corresponds to the skill capability data the relevant hypothesis candidate data 115 may be sent to ranking component 120.

The ranking component 120 may query context component 141 for contextual data 142 (which may be the same or different from context data 48) using one or more of the device ID, entity ID, and/or deviceType ID received as part of the input request data. The contextual data 142 sent to the ranking component 120 may include device context data and/or request context data. The ranking component 120 may use such contextual data 142 during ranking of the hypothesis data represented by the candidate data 115. Skill query service 116 may send a signal 117 indicating what skills can fulfill a particular request (and/or what skills are unable to fulfill the request), and/or how well the skill is able to fulfill the request. The signal 117 may be sent to routing component 112. Routing component 112 may send the signal 117 along with the candidate data 115 to a ranking component 120. In various examples, CFIR tag 143 may indicate situations in which a skill may opt out of processing a particular request (e.g., if the device sending the request data does not include a display screen, etc.). Accordingly, in at least some examples, CFIR 147 may include context data, such as a device ID, to indicate the context of the speech processing enabled device from which the request data was received.

Ranking component 120 may include one or more statistical machine learning models effective to rank the candidates included in candidate data 115. In order to rank the candidate data 115, ranking component 120 may generate confidence scores for each corresponding candidate data 115. As previously described, the ranking component 120 may receive the confidence scores generated by embedding-based retrieval component 110 and may use such scores as an input signal to rank the hypothesis data comprising the candidate data 115. A confidence score output by ranking component 120 may indicate that the corresponding skill 290 and/or intent of the candidate pair is appropriate to process the request. Ranking component 120 may compute features using the candidate data 115, the contextual data 142, and signal 117 (representing CFIR tag 143 and/or skill responses to CFIR 147) in order to predict the ranking of the skills 290 included in the candidate data 115. The features computing during processing of the request data (sometimes referred to as "runtime features") may comprise a feature representation of the list of candidate data 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc.

Ranking component 120 may generate a ranked list 118 of the candidate skills indicated in candidate data 115. In at least some examples, the ranking component 120 may use a deep neural network as a machine learning model for determining the ranked list 118. Inputs to the machine learning models of the ranking component 120 may include NLU output data 106, signal 117 (comprising CFIR tag 143), contextual data 142, candidate data 115, data representing enabled skills (e.g., for the speech processing enabled device and/or account that received the input request data/utterance), NLU confidence data, ASR confidence data, etc.

In various examples, a decider component 132 may receive the ranked list 118 of candidates (including any candidates selected via a dynamic routing adjustment, as described above). In some examples, the decider component 132 may act as a check on the results of the ranking component. For example, there may be scenarios in which statistical models of the ranking component 120 may determine that a request should be routed to a particular skill to perform a particular action. However, there may be risks associated with performance of the action or with routing the request data to the skill for processing. For example, a user may say the phrase "turn on the oven." The ranking component may determine that the top-ranked result is a control skill that is effective to process the request data to turn on the oven. However, contextual data 142 may indicate that the user is not currently at home. Accordingly, turning on the oven may currently be unsafe, and the statistical result of the ranking component 120 may not be a safe or an intended result according to a particular policy. The policy may be a set of deterministic rules used to provide safety boundaries on sensitive requests.

Accordingly, the decider component 132 may compare the results of the ranking component 120 to one or more predefined policies that may indicate whether or not request data should be sent to top-ranked result of the ranking component 120 or whether some other action should be taken. For example, if the phrase "Arm the security system" is interpreted by ASR/NLU as the current utterance, the decider component may comprise a policy indicating that the ranking component results should be ignored and that the utterance should always be passed to a security system skill used to control security system hardware.

In another example, a decider component may determine a class of the utterance. For example, if the utterance is classified as belonging to a sensitive class the speech processing system may use a dialogue speech processing application and/or TTS to confirm the user's intention prior to routing the request data to the top-ranked result of the ranker component. For example, request data may be a request to "unlock the front door." The top-ranked result of the ranking component may be routing to a skill that controls the lock on the front door. However, requests to unlock doors may be classified by the decider component 132 as a sensitive request. Accordingly, the receipt of the sensitive request may trigger a confirmation request output by TTS prior to routing the request data to the top-ranked skill. For example, the confirmation request may be "Did you want me to unlock the front door?" Decider component 132 may output plan data that comprises a routing plan 134 for processing the request data. The routing plan 134 may define a target skill 290 to process the request data as well as a target skill section (from candidate data 115) on which to act. As described above, the target skill 290 may be selected as the top-ranked hypothesis determined by the ranking component 120. As previously described, in various examples, the routing plan 134 may be among the signals input into the downstream arbitration component 94 to arbitrate between on-going and/or completed natural language processing flows.

In some other examples, the decider component 132 may select a target skill 290 based on a policy and/or based on a class of the request data, as described above. In many examples, the skill session to be acted upon may be the skill session output by embedding-based retrieval component 110. However, in some cases, a different skill session may be selected by the ranking component 120 based on the various other inputs. In some examples, the ranking component 120 may determine that two different skills and/or two different skill sessions are equally applicable for processing the request data. In such examples, the decider component 132 may determine that disambiguation should occur. Accordingly, the routing plan 134 may include sending the request data to a dialog skill 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider component 132 may determine that the top two hypotheses of ranking component 120 are equally likely (or approximately equally likely) and may determine that a question should be asked to disambiguate between the two possible actions. Accordingly, the routing plan 134 may route the request data to the dialog skill 152, and the dialog skill 152 may inquire whether the user intended to play the movie or the soundtrack.

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan 134 should be to determine the second highest ranked hypothesis of the ranking component 120. The routing plan 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The natural language routing architecture 200 may also include a TTS component 280 that synthesizes speech (e.g., generates audio data) corresponding to text data input therein. Accordingly, one or more of skills 290, dialog skill 152, fallback component 136, ASR component 250, and/or orchestrator 230. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

Figure 3:
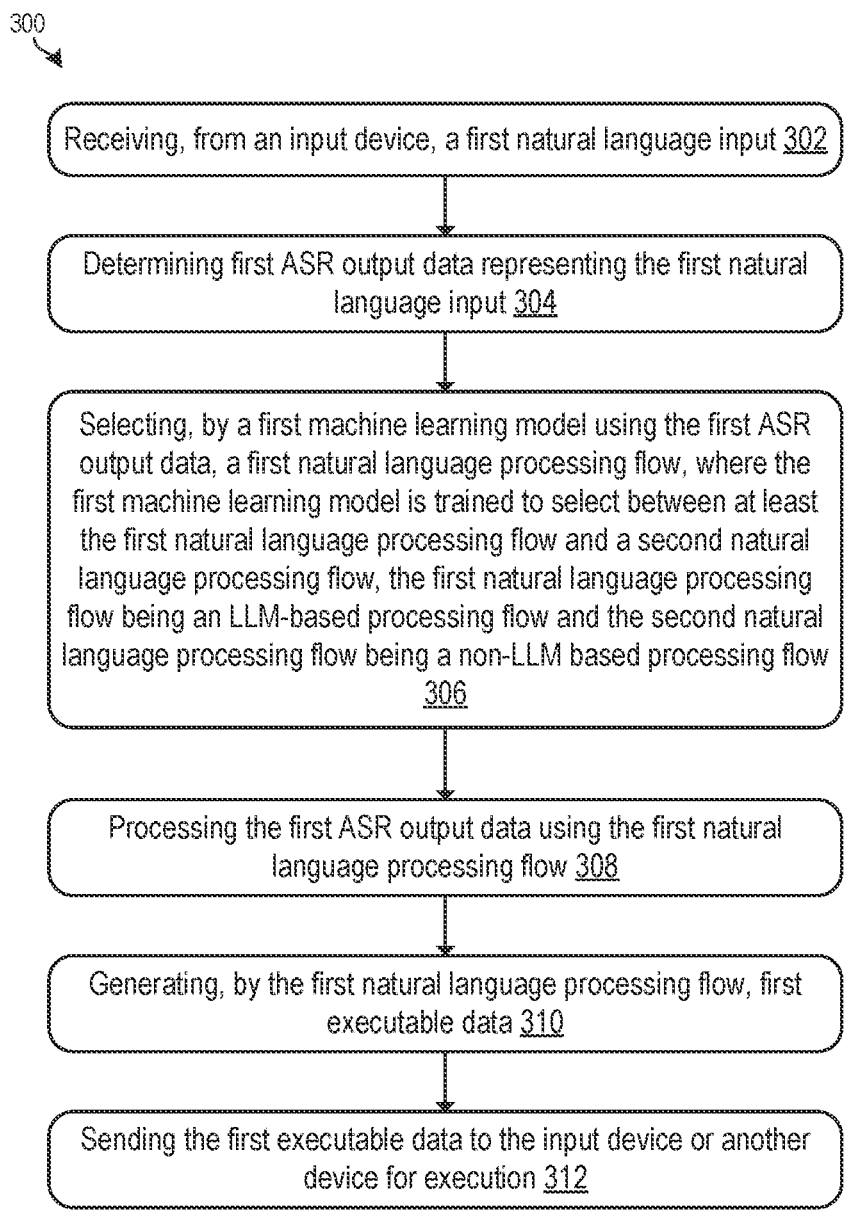
FIG. 3 depict an example process for language model arbitration for natural language processing, in accordance with various aspects of the present disclosure.

FIG. 3 depict an example process 300 for language model arbitration for natural language processing, in accordance with various aspects of the present disclosure. The process 300 of FIG. 3 may be executed by one or more computing devices. The actions of process 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 300 may be described above with reference to elements of FIGS. 1-2. Although shown in a particular order, the steps of process 300 may instead be performed in a different order. Additionally, various steps may be performed in parallel in various implementations. Further, some steps may be omitted and/or other steps may be added in accordance with the network anomaly detection techniques described herein.

Process 300 may begin at action 302, at which an input device (e.g., a natural language processing-enabled device) may receive a first natural language input. The first natural language input may be, for example, a spoken or written request.

Processing may continue at action 304, at which first ASR output data representing the first natural language input may be determined. In the case that the first natural language input is a spoken request, the ASR output data may be a text transcription of the spoken request. If the first natural language input is a written request (e.g., received as text from a companion application of the natural language processing system), the ASR output data may be the text and/or a tokenization of the text. In at least some further examples, the input may be multi-modal (e.g., a voice request combined with an image and/or set of images being displayed on a device (e.g., a smart television)). In such a case, the ASR output data representing the text of the utterance may also be combined with an encoded representation of the image or images, and/or of relevant object detections within the images that are determined to correspond to the input text or speech. For example, a user may be watching a video and may request "Who makes that handbag?" The spoken request may be transcribed using ASR component 250 and one or more frames of the video may be encoded (e.g., using a convolutional neural network or visual transformer model). The upstream processing flow component 92 may receive this information as input and may use such data to arbitrate between different natural language processing flows.

Processing may continue at action 306, at which a first machine learning model may select, using the first ASR output data, a first natural language processing flow. The first machine learning model may be trained to select between at least the first natural language processing flow and a second natural language processing flow. The first natural language processing flow may be an LLM-based processing flow and the second natural language processing flow may be a non-LLM-based processing flow. In various examples, instead of directly using a text transcription of the input data (e.g., the first ASR output data), the first machine learning model may use an encoded representation (e.g., an embedding) of the text. This may enable the first machine learning model to learn to arbitrate not only on the basis of historical requests that match the input text, but also semantically similar requests (in the embedding space).

As previously described, the upstream processing flow component 92 may also ingest a wide range of context data 48 and/or other multi-modal inputs together with or, in some cases, instead of the first ASR output data. Context data 48 may include personalization signals (e.g., user/account information, device identifier data, device state data, time data, location data, enabled skills, enabled natural language processing flows, etc.). Additionally, the upstream processing flow component 92 (comprising the first machine learning model) may receive context data 48 indicating whether there is an on-going dialog session with the user and/or whether a particular natural language processing flow and/or skill is already being used, in the current dialog session, to handle the dialog. The upstream processing flow component 92 may consider such context data when arbitrating between the different available natural language processing flows. Additionally, the upstream processing flow component 92 may select between multiple natural language processing flows and/or agents (e.g., different LLM-based natural language processing flows for different domains and/or having different capabilities).

In the current example, the first machine learning model of the upstream processing flow component 92 selects the first natural language processing flow for processing the first ASR output data. In some examples, the first natural language processing flow may be one of multiple natural language processing flows selected for processing the first ASR output data. In other examples, different ASR output data (related to different natural language inputs) may lead to the first machine learning model selecting the second natural language processing flow or some other natural language processing flow for processing the different input requests. Accordingly, process 300 of FIG. 3 is merely one example of language model arbitration for natural language processing used for illustrative purposes.

Processing may continue at action 308, at which the first ASR output data may be processed using the first natural language processing flow. In the current example, the LLM-based processing flow may be selected for processing the first natural language input. Further detail regarding processing using an example LLM-based process flow is described below in reference to FIG. 8.

Processing may continue at action 310, at which the first natural language processing flow may generate first executable data. For example, the first natural language processing flow may generate an action plan having a series of computer-executable actions that may be taken in order to perform an appropriate action in response to the first natural language input.

Processing may continue at action 312, at which the first executable data may be sent to the input device or another device for execution. For example, the first executable data may cause playback of a requested song to be initiated, may cause a garage door to open, may cause a television to be turned off, may cause the input device to answer the user's question (using a TTS response), etc.

Figure 4:
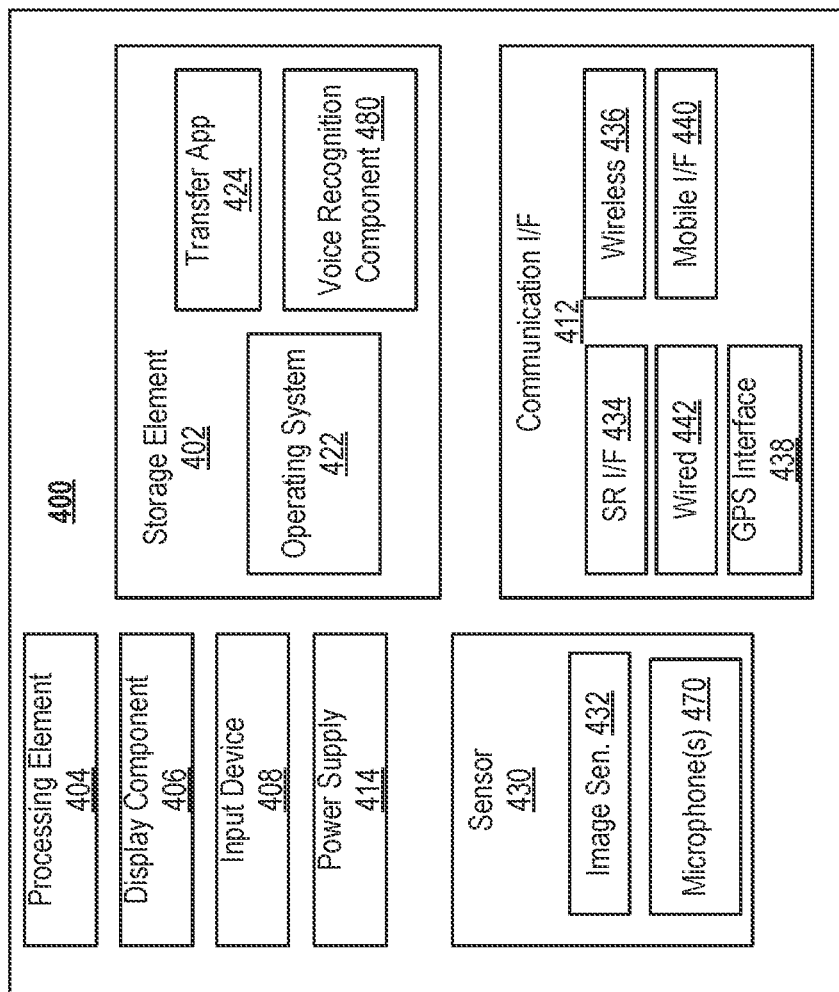
FIG. 4 is a block diagram showing an example architecture of a network-connected device that may be used in accordance with various embodiments described herein.

FIG. 4 is a block diagram showing an example architecture 400 of a network-connected device (e.g., a local network-connected device such as natural language processing-enabled device 102) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise one or more components of the non-LLM-based processing flow 12, the LLM-based processing flow 14, the upstream processing flow arbitration component 92, and/or the downstream arbitration component 94.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
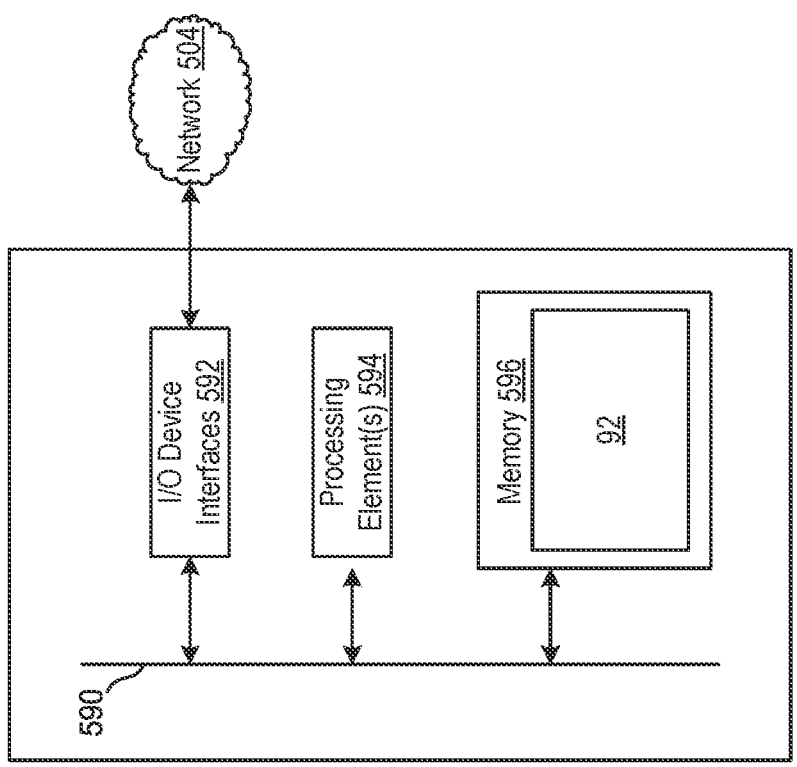
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. For example, the various components of FIG. 5 may be used to implement one or more of the upstream processing flow arbitration component 92, the downstream arbitration component 94, one or more components of the non-LLM-based processing flow 12, the LLM-based processing flow 14, and/or a service storing and/or providing the context data 48. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1), when loaded from memory 596. In various further examples, memory 596 may be effective to store instructions effective to program controllers/processors 594 to perform the various techniques described above in reference to FIGS. 1-3. Accordingly, in FIG. 5, upstream processing flow arbitration component 92 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of natural language routing architecture 200 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
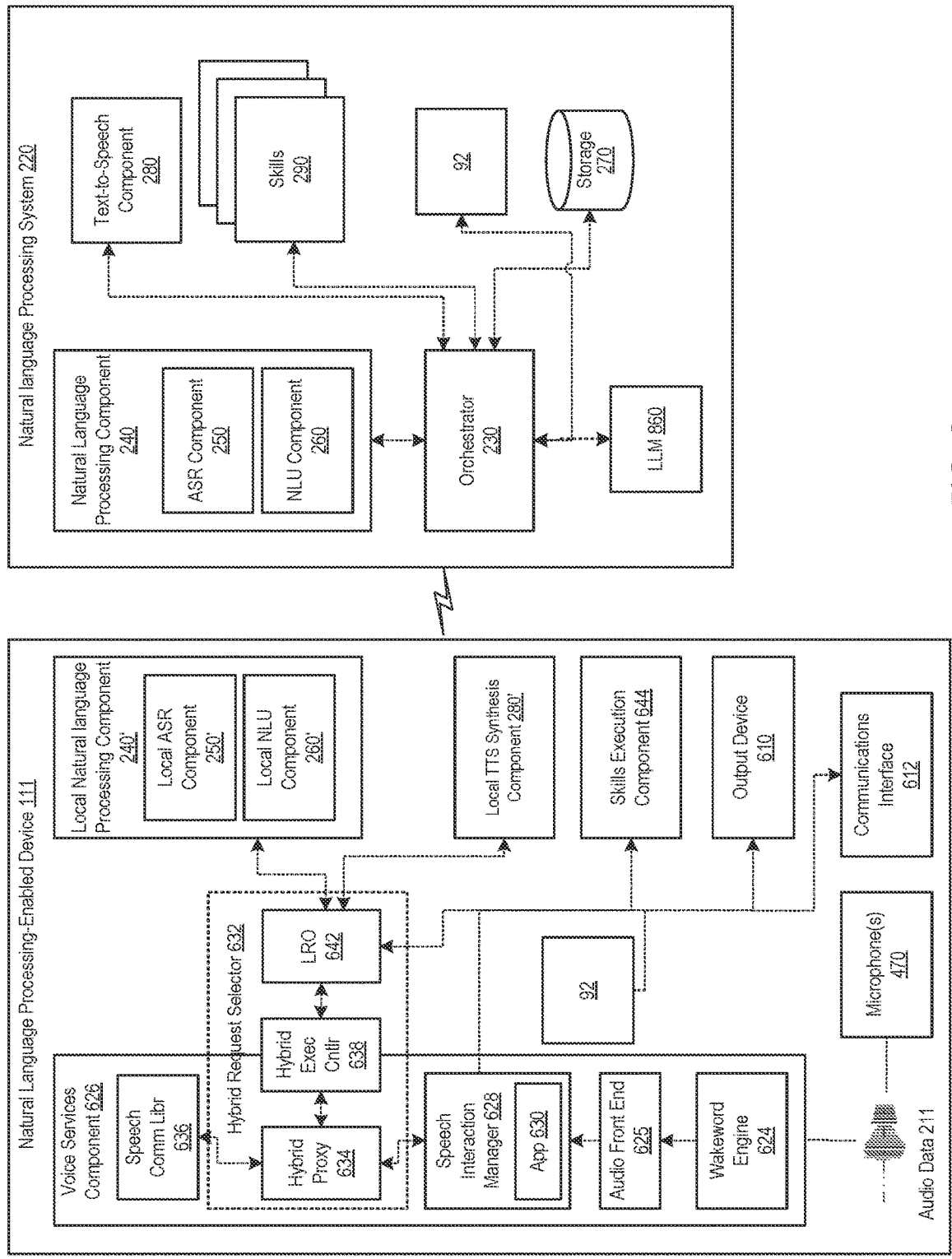
FIG. 6 is a block diagram illustrating a natural language processing-enabled device and a natural language processing management system, in accordance with embodiments of the present disclosure.

FIG. 6 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) one or more other network-connected devices. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 610 (e.g., speakers, displays, and/or other network connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with upstream processing flow arbitration component 92. Accordingly, the device 111 may be used to arbitrate between different candidate natural language processing flows for a given input natural language request.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 612) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 610 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 610 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 626. When a user utterance including the wakeword is captured by the microphone 470 of the device 111, the audio data 211 representing the utterance is received by a wakeword engine 624 of the voice services component 626. The wakeword engine 624 may be configured to compare the audio data 211 to stored models used to detect a wakeword (e.g., "Computer") that indicates to the device 111 that the audio data 211 is to be processed for determining an intent. Thus, the wakeword engine 624 is configured to determine whether a wakeword is detected in the audio data 211, and, if a wakeword is detected, the wakeword engine 624 can proceed with routing the audio data 211 to an audio front end (AFE) 625 (sometimes referred to as an acoustic front end (AFE)) of the voice services component 626. If a wakeword is not detected in the audio data 211, the wakeword engine 624 can refrain from sending the audio data 211 to the AFE 625, thereby preventing the audio data 211 from being further processed. The audio data 211 can be discarded.

The AFE 625 is configured to transform the audio data 211 received from the wakeword engine 624 into data for processing by a suitable ASR component and/or NLU component. The AFE 625 may reduce noise in the audio data 211 and divide the digitized audio data 211 into frames representing a time intervals for which the AFE 625 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 625 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 625 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 625 in beamforming, may be determined based on results of the wakeword engine 624's processing of the audio data 211. For example, the wakeword engine 624 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 628 of the voice services component 626 may receive the audio data 211 that has been processed by the AFE 625. The SIM 628 may manage received audio data 211 by processing request data and non-speech noise or sounds as events, and the SIM 628 may also manage the processing of commands that are used to respond to the user speech or non-speech noise or sounds (e.g., by controlling the action(s) of natural language processing components of device 111). The SIM 628 may include one or more client applications 630 for performing various functions at the device 111.

A hybrid request selector component 632 of the device 111 is shown as including a hybrid proxy component (HP) 634, among other components. The HP 634 can be implemented as a layer within the voice services component 626 that is located between the SIM 628 and a speech communication library (SCL) 636, and may be configured to proxy traffic to/from the natural language processing system 220. For example, the HP 634 may be configured to pass messages between the SIM 628 and the SCL 636 (such as by passing events and instructions there between), and to send messages to/from a hybrid execution controller component (HEC) 638 of the hybrid request selector component 632. For instance, command data received from the natural language processing system 220 can be sent to the HEC 638 using the HP 634, which sits in the path between the SCL 636 and the SIM 628. The HP 634 may also be configured to allow audio data 211 received from the SIM 628 to pass through to the natural language processing system 220 (via the SCL 636) while also receiving (e.g., intercepting) this audio data 211 and sending the received audio data 211 to the HEC 638 (sometimes via an additional SCL).

As will be described in more detail below, the HP 634 and the HEC 638 are configured to perform a handshake procedure to connect to each other. As part of this handshake procedure, the HP 634 and the HEC 638 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 638 determines whether to accept or reject the connection request from the HP 634. If the HEC 638 rejects the HP's 634 connection request, the HEC 638 can provide metadata to the HP 634 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 632 may further include a local request orchestrator component (LRO) 642. The LRO 642 is configured to notify the local natural language processing component 240' about the availability of new audio data 211 that represents user speech, and to otherwise initiate the operations of the local natural language processing component 240' when new audio data 211 becomes available. In general, the hybrid request selector component 632 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 642 may interact with a skills execution component 644 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 624, which detects the wakeword "Computer," and forwards the audio data 211 to the SIM 628 via the AFE 625 as a result of detecting the wakeword. The SIM 628 may send the audio data 211 to the HP 634, and the HP 634 may allow the audio data 211 to pass through to the natural language processing system 220 (e.g., via the SCL 636), and the HP 634 may also input the audio data 211 to the local natural language processing component 240' by routing the audio data 211 through the HEC 638 of the hybrid request selector 632, whereby the LRO 642 notifies the local natural language processing component 240' of the incoming audio data 211. At this point, the hybrid request selector 632 may wait for response data from the natural language processing system 220 and/or the local natural language processing component 240'.

The local natural language processing component 240' is configured to receive the audio data 211 from the hybrid request selector 632 as input, to recognize speech (and/or non-speech audio events) in the audio data 211, to determine an intent (e.g., user intent) from the recognized speech (or non-speech audio event). This intent can be provided to the skills execution component 644 via the LRO 642, and the skills execution component 644 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 644 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 644) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220. In the example of FIG. 6, the natural language processing system 220 is an example of a non-LLM-based processing flow 12. However, in other examples, the backend natural language processing system 220 may be implemented as an LLM-based processing flow 14 (such as the LLM-based processing flow described below in reference to FIG. 8).

Upon receipt by the natural language processing system 220, the audio data 211 may be sent to an orchestrator 230. The orchestrator 230 may include memory and logic that enables the orchestrator 230 to send various pieces and forms of data to various components of the system.

Similar to the operation described above with respect to the local natural language processing component 240' of the device 111, the orchestrator 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by {Musical_Artist}", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the upstream processing flow arbitration component 92 may be instantiated as a part of the natural language processing system 220 and/or as a separate component configured in communication with the natural language processing system 220.

As described above, the natural language processing system 220 may include one or more skills 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

FIG. 7 is an example of training data that may be used for language model arbitration for natural language processing, in accordance with various aspects of the present disclosure. In various examples, the upstream processing flow arbitration component 92 and/or the downstream arbitration component 94 may comprise machine learning models and/or architectures that may be used to select one or more natural language processing flows. For example, supervised machine learning, unsupervised machine learning, and/or reinforcement learning may be used to arbitrate between different natural language processing flows.

The table in FIG. 7 displays an example of data that may be used as training data to train a classifier model that may be used for selecting one or more natural language processing flows for processing a given utterance (e.g., by the upstream processing flow arbitration component 92). The table represents historical data related to past processing of utterances. For example, for utterance A, an LLM-based processing flow was selected. The overall score for the processing of utterance A by the selected LLM-based processing flow was 0.81 (where higher scores are better). This score may be generated by another machine learning model that indicates the quality of the user experience. In various examples, this score may be explicitly provided and/or may be generated on the basis of various signals indicating user friction (e.g., a user stopping an experience within a short time after the experience was output), user satisfaction (e.g., a user saying "I love this!" after an output action is taken or a user allowing the output action to persist for longer than a threshold amount of time without making another request to change or modify the output), a confidence score generated on the basis of past similar or identical utterances, error results and/or performance metrics generated during the course of natural language processing, etc.

The result column of the table in FIG. 7 shows the actual result (e.g., the output action) that was taken in response to the utterance. For example, for utterance A, a smart light with light identifier data LightID_127 was set to 50% brightness. In this example, the user's utterance may have been "Please set my kitchen light to medium brightness." The context data column shows contextual data that may have been retrieved (e.g., during action plan generation for LLM-based processing) in order to surface the result. For the example of utterance A, the device ID (e.g., of the device receiving the utterance and/or other devices associated with the users' account) may have been determined, along with the account ID, the time, various device states, etc.

Note that utterance B, which was processed using a non-LLM-based processing flow has a low score (0.04). This low score may have resulted from an error during processing (e.g., no intent could be determined for utterance B). Accordingly, no action was taken, resulting in a low score. In FIG. 7, each row of the table represents a different training instance.

A supervised classifier model may use such training data to predict, for a given utterance, a score indicating how well each different natural language processing flow is likely to perform during processing of the utterance. However, in various other examples, instead of using scores, the classifier model may use a combination of features to select a processing flow for processing a given utterance on the basis of the historical training data. Other inputs may include utterance text (transcription), intent data (for non-LLM-based processing flows), action plan data (for LLM-based processing flows), confidence scores, intermediate processing data, metadata, etc. The upstream processing flow arbitration component 92 and/or the downstream arbitration component 94 may use such scores to select one or more natural language processing flows for the input utterance. For example, the upstream processing flow arbitration component 92 may select all natural language processing flows with scores above a high score threshold for processing the utterance. In another example, the downstream arbitration component 94 may terminate any process flows if the score drops below a given low threshold during processing. It should be noted that the actual implementation and decision logic may vary according to the desired implementation. The classifier model may be trained to select a natural language processing flow for a given natural language input that optimizes the performance (e.g., by maximizing the score or other metric used to assess natural language processing performance). For example, parameters of the classifier model (or other machine learning model employed by the upstream processing flow arbitration component 92 and/or the downstream arbitration component 94) may be updated to optimize accurate performance prediction (assessed using the desired score/metric(s)) of various different natural language processing flows. The natural language processing flow that has the highest score (or best performance as assessed using the desired performance metric(s)) may be selected for processing a given natural language input.

In various examples, the inputs to such a classifier model (as well as the training data) may include semantic embeddings of the utterance text. This may be beneficial as it may enable the classifier to understand semantically similar (but not identical) text and may route semantically similar text to the same processing flow. However, in some cases, utterances that are semantically similar, but which include different phrasing, may not be processed at the same level of quality by a given natural language processing flow. The classifier may learn the most beneficial processing flow(s) for different utterances through the training data. In a simplistic instantiation where there is only a single non-LLM-based processing flow and a single LLM-based processing flow, the classifier may be a binary classifier. However, a multi-class classifier that may select a set of natural language processing flows may instead be used in various implementations.

Figure 8:
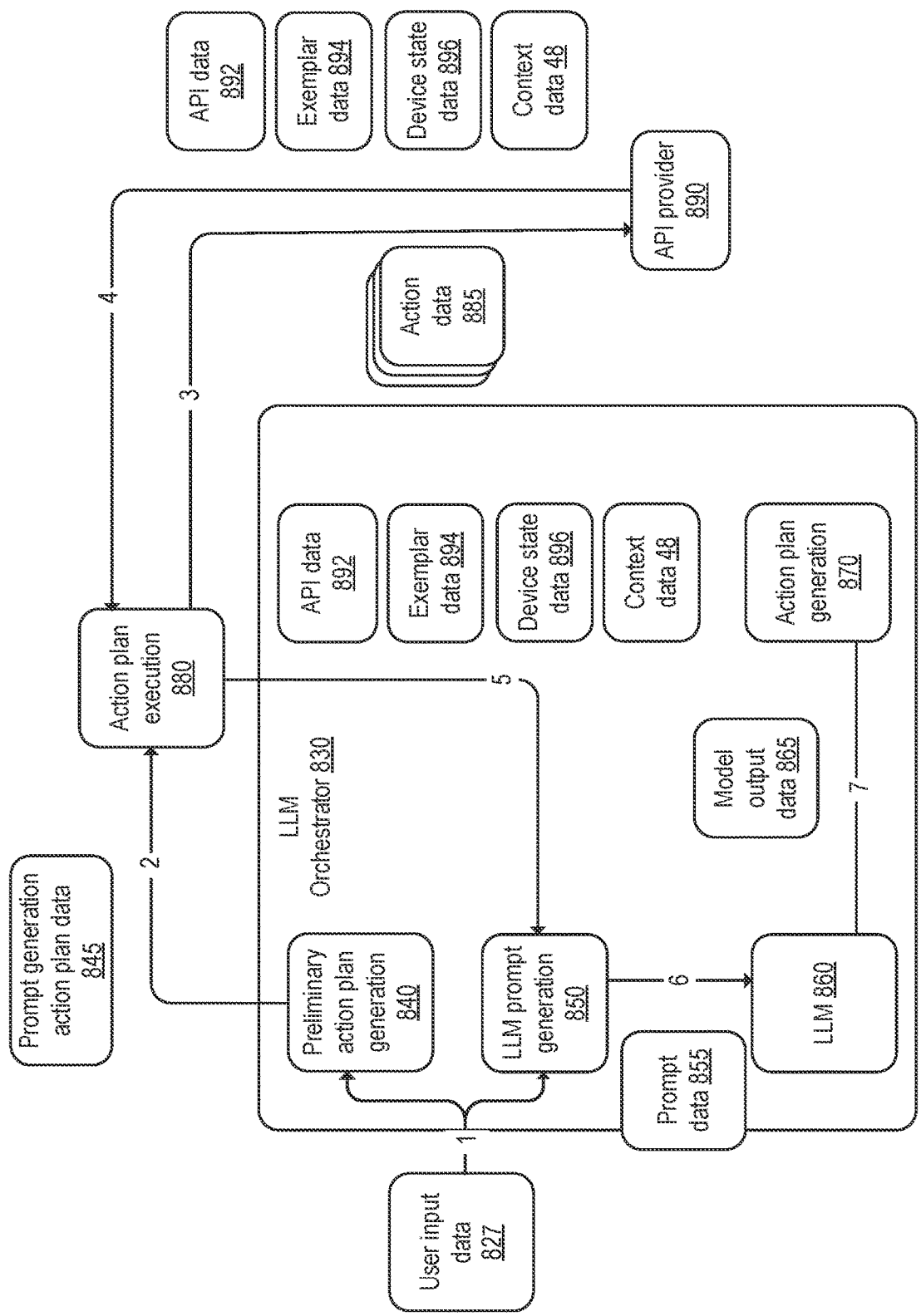
FIG. 8 depicts an example LLM-based natural language processing flow, in accordance with various aspects of the present disclosure.

FIG. 8 depicts an example LLM-based natural language processing flow, in accordance with various aspects of the present disclosure. The example architecture in FIG. 8 includes an LLM orchestrator 830 and various other components for determining an action responsive to a user input. The architecture may further include an action plan execution component 880 and an API provider component 890. With reference to FIG. 8, the LLM orchestrator 830 may include a preliminary action plan generation component 840, a LLM prompt generation component 850, an LLM 860, and an action plan generation component 870. In various examples, the LLM 860 may be a generative model.

In some examples, the LLM 860 may be a transformer-based seq2seq model involving an encoder-decoder architecture. In some such embodiments, the LLM 860 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LLM 860 may be pre-trained for approximately 1 trillion tokens. Being trained on CLM tasks, the LLM 860 may be capable of in-context learning. An example of such a LLM is Alexa Teacher Model (Alexa™).

In various examples, the input to the LLM 860 may be in the form of a prompt. A prompt may be a natural language input, for example, an instruction, for the LLM 860 to generate an output according to the prompt. The output generated by the LLM 860 may be a natural language output responsive to the prompt. The prompt and the output may be text in a particular spoken language. For example, for an example prompt "how do I cook beans?", the LLM 860 may output a recipe (e.g., a step-by-step process) to cook beans. As another example, for an example prompt "I am hungry. What restaurants in the area are open?", the LLM may output a list of restaurants near the user that are open at the current time.

The LLM 860 may be configured using various learning techniques. For example, in some embodiments, the LLM 860 may be configured (e.g., "fine tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the LLM 860 may be configured using one-shot learning, which is similar to few-shot learning, except the model is provided with a single example. As another example, in some embodiments, the LLM 860 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LLM orchestrator 830 may be configured for generating the prompt to be used by the LLM 860 to determine an action responsive to a user input. As shown in FIG. 8, the LLM orchestrator 830 receives (at step 1) user input data 827. In some instances, the user input data 827 may correspond to a text or tokenized representation of a user input. For example, prior to the LLM orchestrator 830 receiving the user input data 827, another component (e.g., an ASR component) may receive audio data representing the user input. The ASR component may perform ASR processing on the audio data to determine ASR output data corresponding to the user input. As previously described, the ASR component (e.g., ASR component 250) may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the user input data 827 may include a top scoring ASR hypothesis of the ASR data.

As illustrated in FIG. 8, the user input data 827 may be received at the preliminary action plan generation component 840 and the LLM prompt generation component 850 of the LLM orchestrator 830. The preliminary action plan generation component 840 processes the user input data 827 to generate prompt generation action plan data 845 corresponding to an instruction(s) (e.g., a request(s)) for one or more portions of data usable to generate a language model prompt for determining an action responsive to the user input). In some examples, the one or more portions of data may be data that is determined to be relevant for processing of the user input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the user input data 827 represents a user input of "please turn on the kitchen lights every morning at 7 am," then the preliminary action plan generation component 840 may determine prompt generation action plan data 845 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the user input data 827 represents a user input of "What is the elevation of Mt. Everest," then the preliminary action plan generation component 840 may determine prompt generation action plan data 845 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant.

In some examples, the prompt generation action plan data 845 may include one or more executable API calls usable for retrieving the one or more portions of data from the corresponding component. For example, instructions included in the prompt generation action plan data 845 may include "FETCH_API," "FETCH_EXEMPLAR," "FETCH_DEVICE_STATE," "FETCH_CONTEXT," etc., along with optional API arguments/inputs. In some embodiments, the prompt generation action plan data 845 may also include the user input data 827. The prompt generation action plan data 845 may be sent (at step 2) to the action plan execution component 880.

In some examples, the preliminary action plan generation component 840 may be configured to process the user input data 827 to determine a representation of the user's request. In various examples, the representation of the user's request may be a reformulation of the user's request. For example, the if the user input data 827 represents a user input of "I have always wanted to travel to Japan, I have heard it's beautiful. How tall is Mt. Fuji?", then the preliminary action plan generation component 840 may determine the representation of the user's request as being "How tall is Mt. Fuji," or the like. The preliminary action plan generation component 840 may generate the prompt generation action plan data 845 using the determined representation of the user's request.

In some examples, the preliminary action plan generation component 840 may implement one or more machine learning (ML) models. A first ML model(s) may be configured to take as input the user input data 827 and generate a representation of the user's request. For example, the ML model may be a text summarization model or a text rewrite model. A second ML model (or the first ML model) may be configured to take as input the representation of the user's request (or the user input data 827) and determine the one or more portions of data relevant for processing of the user input. For example, the second ML model may be a classifier trained to classify the user's request (or the user input data 827) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 840 may be an LLM, similar to the LLM 860. In such embodiments, the architecture (e.g., LLM-based processing flow 14) may include a further component configured to generate a prompt to be provided to the LLM (e.g., similar to the LLM prompt generation component 850) or the prompt may be generated by the LLM prompt generation component 850. The component may generate a prompt (e.g., according to a template) including the user input data 827 and instructions to determine the one or more portions of data (or types of data) relevant to the processing of the user input. The LLM may process the prompt and generate model output data representing the one or more portions of data (or types of data). The preliminary action plan generation component 840 may process the model output data to determine the prompt generation action plan data 845.

The action plan execution component 880 may process the prompt generation action plan data 845 to execute the one or more instructions to retrieve/receive data corresponding to the user input and that may be used to generate the language model prompt. As shown in FIG. 8, the action plan execution component 880 processes the prompt generation action plan data 845 to generate action data 885 representing an action included in the prompt generation action plan data 845 (e.g., a single instruction, such as FETCH_CONTEXT). For example, in the situation where the action is represented by an API call, the action data 885 may represent the action plan execution component 880 executing the API call included in the prompt generation action plan data 845. The action data 885 may be sent (at step 3) to the API provider component 890. In the situation where the prompt generation action plan data 845 includes more than one instruction, the action plan execution component 880 may generate more than one instance of action data 885 (e.g., one instance for each instruction included in the prompt generation action plan data 845) and send each instance to the API provider component 890.

The API provider component 890 may process the (one or more instances of the) action data 885 and cause the retrieval of the (one or more portions of) data associated with the action data 885. The API provider component 890 may include a knowledge provider component. The knowledge provider component may include an API retrieval component, an exemplar retrieval component, a device state retrieval component, and an "other" context retrieval component. The knowledge provider component may provide the action data 885 to the component(s) configured to determine the data corresponding to the request(s) represented by the action data 885.

For example, the API retrieval component (not shown) may process the action data 885 to generate API data 892 representing one or more APIs that correspond to an action performable with respect to the user input. For example, if the user input corresponds to "turn on the kitchen light," the API retrieval component may determine an API usable to control a device and include an API definition corresponding to the API in the API data 892. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 892 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 892. In some embodiments, the API retrieval component may include the top-n identified API definitions in the API data 892. The API data 892 may be sent (at step 4) to the action plan execution component 880 as shown in FIG. 8.

For further example, the exemplar retrieval component may process the action data 885 to generate exemplar data 894 representing one or more exemplars associated with one or more APIs (e.g., the API represented by the API data 892). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device=" lights")." In some embodiments, an exemplar represented in the exemplar data 894 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action (device: str)" and "Routine.create_time_trigger (hour: [hour value])" and the current user input "please turn on the kitchen light everyday at 7 am," the exemplar retrieval component may select an exemplar representing:

{Customer:
turn on the kitchen light everyday at 7 am
Thought: the customer is trying to create a routine
Action:
Routine.create_routine
   (trigger=Routine.create_time_trigger (hour=
7),           action=Routine.create_turn_on_action
   (device="kitchen light"))
Observation: routine created successfully
Thought: time to respond
Response: I have created a routine for you. Anything else?
}

Although not illustrated in FIG. 8, in some embodiments, the API provider component 890 and/or a knowledge provider component may provide the exemplar retrieval component with the action data 885 and a list of API call(s) to which the determined exemplars are to be associated (e.g., the API call(s) included in the API data 892). In some embodiments, the one or more exemplars may be included in the exemplar data 894 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 894. In some embodiments, the exemplar retrieval component may include the top-n identified exemplars in the exemplar data 894. The exemplar data 894 may be sent (at step 4) to the action plan execution component 880 as shown in FIG. 8.

As another example, a device state retrieval component (not shown in FIG. 8) may process the action data 885 to generate device state data 896 representing one or more states of one or more devices associated with/relevant to the user input (e.g., whether the device is powered on or off, a volume level associated with the device, etc.). For example, if the user input corresponds to "Please turn on the kitchen light," the device state data 896 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 896. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 896. The device state data 896 may be sent (at step 4) to the action plan execution component 880 as shown in FIG. 8.

As a further example, a context retrieval component (not shown) may process the action data 885 to generate other context data 48 (apart from the device state data 896, the API data 892, the exemplar data 894, etc.) representing one or more contexts associated with/relevant to the user input. For example, the other context data 898 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component 48 may include the top-n identified context in the other context data 48. The other context data 48 may be sent (at step 4) to the action plan execution component 880 as shown in FIG. 8.

In some embodiments, the knowledge provider component may be configured to cause one or more of the API retrieval component, the exemplar retrieval component, the device state retrieval component, and the other context retrieval component to process based on the data output by one or more of the components of the knowledge provider component. For example, if the output of the API retrieval component (e.g., the API data 892) indicates that a related API definition was identified, then the knowledge provider component (or another component) may cause the exemplar retrieval component to process to determine one or more exemplars related to the identified API definitions. For further example, if the output of the API retrieval component (e.g., the API data 892) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 840, as discussed above).

The action plan execution component 880 may send (step 5) the data received from the API provider component 890 (e.g., the API data 892, the exemplar data 894, the device state data 896, and the other context data 48) to the LLM prompt generation component 850. The LLM prompt generation component 850 may be configured to generate prompt data 855 (e.g., using the user input data 827, the API data 892, the exemplar data 894, the device state data 896, and/or the other context data 48) to be used by the LLM 860.

In some examples, the LLM prompt generation component 850 may generate the prompt data 855 representing a prompt for input to the LLM 860. In some embodiments, such prompt data 855 may be generated based on combining the user input data 827, the API data 892, the exemplar data 894, the device state data 896, and the other context data 48. The prompt data 855 may be an instruction to determine an action(s) responsive to the user input data 827 given the other information (e.g., the API data 892, the exemplar data 894, the device state data 896, the other context data 48) included in the prompt data 855. In some embodiments, the LLM prompt generation component 850 may also include in the prompt data 855 a sample processing format to be used by the LLM 860 when processing the prompt and generating the response. In some embodiments, the prompt data 855 may be generated according to a template format. For example, the prompt data 855 may adhere to a template format of:

{You have access to the following API's:
[API(s) (e.g., the API data 192)]
Use the following format:
User: the input utterance of a user
Thought: optionally think about what to do
Action: take an action by calling APIs
Observation: what the API execution returns . . .
(this thought/action/action input/observation can repeat N times)
Thought: done
Response: the proper response to the user (end of turn)
Examples
[Exemplar(s) (e.g., the exemplar data 894)]
Context: [device state(s) (e.g., the device state data 896)]
[other
context(s) (e.g., the other context data 48)]
User: [the user input (e.g., the user input data 827)]}

In some examples, the template format may instruct the LLM 860 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the LLM 860 to generate an output representing the determined interpretation of the user input by the LLM 860 (e.g., the user is requesting [intent of the user input], the user is trying to [intent of the user Input], etc.) As another example, the format may include the label "Observation:" labeling the following string of characters/tokens as the result of performance of an action determined by the LLM 860/the LLM 860's interpretation of the result of the performance of the action determined by the LLM 860. As a further example, the format may include a label of "Response:" instructing the LLM 860 to generate a response (e.g., a natural language output for a user) to the prompt.

Following such a template format, for example, and for a user input of "turn on the living room light" and corresponding API data, exemplar data, device state data, and other context data, the LLM prompt generation component 850 may generate example prompt data 855a:

{You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns . . .
(this thought/action/action input/observation can repeat N times)
Thought: done
Response: the proper response to the user (end of turn)
Examples
User: turn on all indoor lights
Thought: the user is trying to turn lights on
Action: turn_on_device (device= "indoor light 1")
turn_on_device (device= "indoor light 2")
Observation: success success
Thought: time to respond
Response: Anything else I can help you with?
Context: the user has the following devices, bathroom light,
bedroom light, kitchen light, and living room light.
User: turn on the living room light.
}

In some embodiments, the LLM prompt generation component 850 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LLM 860 processes the prompt data 855 to generate model output data 865 representing an action responsive to the user input. For example, based on processing the example prompt data provided above, the LLM 860 may output model output data 865: {"Thought: the user is trying to turn on the living room light; Action: turn_on_device (device=" living room light"),"} or the like. The model output data 865 is sent (at step 7) to the action plan generation component 870. The action plan generation component 870 may parse the model output data 865 to determine action plan data representing the action generated by the LLM 860. For example, for the model output data 865: "Action: turn_on_device (device=" living room light")," the corresponding action plan data may correspond to "turn_on_device (device=" living room light ")" (e.g., corresponding to the action generated by the LLM 860, without the label of "Action"). In some embodiments, the action plan generation component 870 may determine an API call corresponding to the "Action" data included in the model output data 865. For example, in some embodiments, the action plan generation component 870 may fill in the arguments/inputs, if any, for the API call, which may be included in the action plan data. For further example, in some embodiments, the action plan execution component 880 may fill in the arguments/inputs, if any, for the API call.

In some embodiments, the LLM orchestrator 830 (e.g., the action plan generation component 870 or another component of the LLM orchestrator 830) may determine whether the LLM 860 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator 830 may use a knowledge base, web search, etc. to fact-check information included in the output.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
    receiving, by a first input device, a first natural language input;
    generating, using an automatic speech recognition (ASR) component, first ASR output data comprising a first text transcription of the first natural language input;
    determining first device identifier data that identifies the first input device;
    determining first state data describing a state of at least the first input device;
    inputting the first ASR output data, the first device identifier data, and the first state data into a machine learning classifier model, wherein the machine learning classifier model is trained to select from among a large language model (LLM) based processing flow and an intent-based processing flow for processing natural language inputs;
    selecting, by the machine learning classifier model, the LLM-based processing flow for processing the first natural language input;
    generating, by the LLM-based processing flow using the first ASR output data, first executable data; and
    sending the first executable data to the first input device or another device, wherein the first input device or another device is configured to execute the first executable data to perform a first action.

2. The computer-implemented method of claim 1, further comprising:
    determining first dialog session data indicating that a second natural language input of a current dialog session that includes the first natural language input was routed to the LLM-based processing flow for processing; and
    generating second state data representing the first dialog session data, wherein the second state data is input into the machine learning classifier model, and the LLM-based processing flow is selected for processing the first natural language input based at least in part on the second state data.

3. The computer-implemented method of claim 1, further comprising:
determining first domain data associated with the LLM-based processing flow, the first domain data indicating at least one of a capability or natural language processing domain of the LLM-based processing flow;
determining a correspondence between the first domain data and a subject of the first natural language input; and
selecting the LLM-based processing flow for processing the first natural language input based on the correspondence.

4. A method comprising:
receiving, from a first input device, a first natural language input;
determining first automatic speech recognition (ASR) output data representing the first natural language input;
selecting, by a first machine learning model using the first ASR output data, a first natural language processing flow, wherein the first machine learning model is trained to select between at least the first natural language processing flow and a second natural language processing flow, wherein the first natural language processing flow is a large language model (LLM)-based processing flow and the second natural language processing flow is an intent-based processing flow;
processing the first ASR output data using the first natural language processing flow; and
generating, by the first natural language processing flow, first executable data; and
sending the first executable data to the first input device or a second device, wherein the first input device or the second device executes the first executable data to perform a first action.

5. The method of claim 4, further comprising:
determining first state data indicating a current dialog session including the first natural language input, wherein the first state data further indicates that the first natural language processing flow was selected to process at least one previous natural language input of the current dialog session; and
inputting the first state data into the first machine learning model, wherein the first machine learning model selects the first natural language processing flow based at least in part on the first state data.

6. The method of claim 4, further comprising:
determining a subject of the first natural language input; and
determining a correspondence between the subject of the first natural language input and a first natural language processing domain associated with the first natural language processing flow, wherein the first machine learning model selects the first natural language processing flow based at least in part on the correspondence.

7. The method of claim 4, further comprising:
receiving, by the first machine learning model, a first training instance comprising a second natural language input, first data indicating that the first natural language processing flow was selected for processing the second natural language input, and first result data assessing performance of the first natural language processing flow in processing the second natural language input;
receiving, by the first machine learning model, a second training instance comprising a third natural language input, second data indicating that the second natural language processing flow was selected for processing the third natural language input, and second result data assessing performance of the second natural language processing flow in processing the third natural language input; and
updating parameters of the first machine learning model using the first training instance and the second training instance to optimize performance of selected natural language processing flows for natural language inputs.

8. The method of claim 4, further comprising:
generating first flag data indicating that the first natural language processing flow was used to process the first natural language input;
storing the first flag data in memory in association with a first time to live (TTL) value;
receiving, by the first input device, a second natural language input prior to an expiration of the first TTL value; and
selecting the first natural language processing flow for processing the second natural language input based at least in part on the first flag data.

9. The method of claim 8, further comprising extending the first TTL value based at least in part on receipt of the second natural language input prior to the expiration of the first TTL value.

10. The method of claim 4, further comprising determining first state data describing a current state of at least the first input device, wherein the first machine learning model selects the first natural language processing flow further based at least in part on the first state data.

11. The method of claim 4, further comprising determining first device type data indicating a type of the first input device, wherein the first machine learning model selects the first natural language processing flow further based at least in part on the first device type data.

12. The method of claim 4, wherein the first machine learning model is configured to select, from among a set of natural language processing flows comprising the first natural language processing flow and the second natural language processing flow, a subset of natural language processing flows for processing a second natural language input.

13. A system comprising:
at least one processor; and
non-transitory computer-readable memory storing instructions that, when executed by the at least one processor, are effective to:
receive, from a first input device, a first natural language input;
determine first automatic speech recognition (ASR) output data representing the first natural language input;
select, by a first machine learning model using the first ASR output data, a first natural language processing flow, wherein the first machine learning model is trained to select between at least the first natural language processing flow and a second natural language processing flow, wherein the first natural language processing flow is a large language model (LLM)-based processing flow and the second natural language processing flow is an intent-LLM-based processing flow;

process the first ASR output data using the first natural language processing flow;

generate, by the first natural language processing flow, first executable data; and send the first executable data to the first input device or a second device, wherein the first input device or the second device executes the first executable data to perform a first action.

14. The system of claim 13, the non-transitory computer-readable memory storing further instructions that, when executed by the at least one processor, are further effective to:

determine first state data indicating a current dialog session including the first natural language input, wherein the first state data further indicates that the first natural language processing flow was selected to process at least one previous natural language input of the current dialog session; and input the first state data into the first machine learning model, wherein the first machine learning model selects the first natural language processing flow based at least in part on the first state data.

15. The system of claim 14, the non-transitory computer-readable memory storing further instructions that, when executed by the at least one processor, are further effective to:

determine a subject of the first natural language input; and determine a correspondence between the subject of the first natural language input and a first natural language processing domain associated with the first natural language processing flow, wherein the first machine learning model selects the first natural language processing flow based at least in part on the correspondence.

16. The system of claim 15, the non-transitory computer-readable memory storing further instructions that, when executed by the at least one processor, are further effective to:

receive, by the first machine learning model, a first training instance comprising a second natural language input, first data indicating that the first natural language processing flow was selected for processing the second natural language input, and first result data assessing performance of the first natural language processing flow in processing the second natural language input;

receive, by the first machine learning model, a second training instance comprising a third natural language input, second data indicating that the second natural language processing flow was selected for processing the third natural language input, and second result data assessing performance of the second natural language processing flow in processing the third natural language input; and update parameters of the first machine learning model using the first training instance and the second training instance to optimize performance of selected natural language processing flows for natural language inputs.

17. The system of claim 13, the non-transitory computer-readable memory storing further instructions that, when executed by the at least one processor, are further effective to:

generate first flag data indicating that the first natural language processing flow was used to process the first natural language input;

store the first flag data in memory in association with a first time to live (TTL) value;

receive, by the first input device, a second natural language input prior to an expiration of the first TTL value; and select the first natural language processing flow for processing the second natural language input based at least in part on the first flag data.

18. The system of claim 17, the non-transitory computer-readable memory storing further instructions that, when executed by the at least one processor, are further effective to:

extend the first TTL value based at least in part on receipt of the second natural language input prior to the expiration of the first TTL value.

19. The system of claim 13, the non-transitory computer-readable memory storing further instructions that, when executed by the at least one processor, are further effective to:

determine first state data describing a current state of at least the first input device, wherein the first machine learning model selects the first natural language processing flow further based at least in part on the first state data.

20. The system of claim 13, the non-transitory computer-readable memory storing further instructions that, when executed by the at least one processor, are further effective to:

determine first device type data indicating a type of the first input device, wherein the first machine learning model selects the first natural language processing flow further based at least in part on the first device type data.

* * * * *